United States Patent
Burton et al.

(10) Patent No.: US 10,923,942 B2
(45) Date of Patent: Feb. 16, 2021

(54) ACTIVATION OF ELECTRONIC DEVICES

(71) Applicant: RHEON LABS LTD, London (GB)

(72) Inventors: Thomas Burton, London (GB); Daniel Plant, London (GB)

(73) Assignee: Rheon Labs Ltd, London (GB)

( * ) Notice: Subject to any disclaimer, the term of this patent is extended or adjusted under 35 U.S.C. 154(b) by 0 days.

(21) Appl. No.: 16/405,444

(22) Filed: May 7, 2019

(65) Prior Publication Data

US 2019/0296576 A1    Sep. 26, 2019

Related U.S. Application Data

(63) Continuation of application No. PCT/GB2017/053340, filed on Nov. 7, 2017.

(30) Foreign Application Priority Data

Nov. 7, 2016 (GB) .................... 1618753.6

(51) Int. Cl.
| | | |
|---|---|---|
| G06F 1/16 | (2006.01) | |
| H02J 9/00 | (2006.01) | |
| F41H 1/02 | (2006.01) | |
| F41H 1/04 | (2006.01) | |
| G01S 19/18 | (2010.01) | |
| H01B 1/24 | (2006.01) | |
| H01M 2/10 | (2006.01) | |
| H02J 7/00 | (2006.01) | |
| H04W 52/02 | (2009.01) | |

(52) U.S. Cl.
CPC ............ *H02J 9/005* (2013.01); *F41H 1/02* (2013.01); *F41H 1/04* (2013.01); *G01S 19/18* (2013.01); *G06F 1/1635* (2013.01); *H01B 1/24* (2013.01); *H01M 2/1016* (2013.01); *H02J 7/0042* (2013.01); *H04W 52/0261* (2013.01)

(58) Field of Classification Search
None
See application file for complete search history.

(56) References Cited

U.S. PATENT DOCUMENTS

| | | | | |
|---|---|---|---|---|
| 3,852,570 A * | 12/1974 | Tyler | ............ | H05B 3/36 |
| | | | | 219/528 |
| 3,889,362 A * | 6/1975 | Tyler | ............ | H05B 3/56 |
| | | | | 29/619 |
| 4,006,326 A * | 2/1977 | Lejeune | ............ | B60C 23/08 |
| | | | | 200/61.24 |
| 4,576,172 A | 3/1986 | Bentall | | |
| 5,889,463 A | 3/1999 | Judd et al. | | |

(Continued)

*Primary Examiner* — Courtney L Smith
*Assistant Examiner* — Rashen E Morrison
(74) *Attorney, Agent, or Firm* — Patterson + Sheridan LLP

(57) ABSTRACT

Certain aspects of the present disclosure provide an apparatus comprising a battery encapsulated within a sealed enclosure, an electronic device encapsulated within the sealed enclosure, a power control circuit encapsulated within the sealed enclosure, and a loop of conductive medium connected to the power control circuit. The electronic device is in a deactivated state. At least a portion of the loop of conductive medium passes out of and back into the sealed enclosure. In response to severing of the at least portion of the loop of conductive medium which is outside of the sealed enclosure, the power control circuit is configured to cause activation of the electronic device.

22 Claims, 2 Drawing Sheets

(56) References Cited

U.S. PATENT DOCUMENTS

| | | | | |
|---|---|---|---|---|
| 6,045,652 | A * | 4/2000 | Tuttle | G01S 13/758 |
| | | | | 156/278 |
| 7,056,179 | B2 * | 6/2006 | Courtney | B63C 9/0005 |
| | | | | 441/90 |
| 7,059,769 | B1 * | 6/2006 | Potega | G01R 31/3835 |
| | | | | 374/185 |
| 9,780,416 | B2 * | 10/2017 | Bober | H01M 10/647 |
| 2013/0279096 | A1 * | 10/2013 | Gengler | G06F 1/1669 |
| | | | | 361/679.01 |
| 2014/0135593 | A1 * | 5/2014 | Jayalth | A61B 5/0004 |
| | | | | 600/301 |
| 2016/0054448 | A1 | 2/2016 | Woolf et al. | |
| 2020/0125195 | A1 * | 4/2020 | Tremmel | G06F 3/044 |

* cited by examiner

ACTIVATION OF ELECTRONIC DEVICES

CROSS-REFERENCE TO RELATED APPLICATIONS

This application is a continuation of International Application PCT/GB2017/053340, filed on Nov. 7, 2017, which claims priority to GB Application No. 1618753.6, filed on Nov. 7, 2016, both of which are incorporated by reference herein in their entirety.

INTRODUCTION

The present invention relates to electronic devices. In particular, but not exclusively, the present invention relates to activation of electronic devices.

Current methods for ensuring the long shelf life of batteries pre-installed into electronics include: (1) removal of an insulating tab to create a direct contact between the battery and some electronics; (2) a hold-down button for activation to allow a device to be turned on or off; and (3) a magnetic switch where removal or application of a magnet to a specific area makes or breaks a reed switch which will in turn activate the electronics.

Known methods can be susceptible to vibration or shock loading during or before use which may render them unsuitable for some applications. For example, reed switches can momentarily break with vibration and hold-down buttons may be inadvertently pressed during shipping causing early activation of electronics.

Known methods involving removal of an insulating tab may be unsuitable where electronics are encapsulated within an enclosure because once the tab is removed, a gap is produced in the enclosure.

BRIEF SUMMARY

According to a first aspect of the present disclosure, there is provided apparatus comprising: a battery encapsulated within a sealed enclosure; an electronic device encapsulated within the sealed enclosure, wherein the electronic device is in a deactivated state; a power control circuit encapsulated within the sealed enclosure; and a loop of conductive medium connected to the power control circuit, wherein at least a portion of the loop of conductive medium passes out of and back into the sealed enclosure, and wherein, in response to severing of the at least portion of the loop of conductive medium which is outside of the sealed enclosure, the power control circuit is configured to cause activation of the electronic device.

According to a second aspect of the present disclosure, there is provided a wearable item comprising the apparatus of the first aspect.

According to a third aspect of the present disclosure, there is provided circuitry comprising: a battery encapsulated within a sealed enclosure; an electronic device encapsulated within the sealed enclosure, wherein the electronic device is in a deactivated state; a power control circuit encapsulated within the sealed enclosure; and a loop of conductive medium connected to the power control circuit, wherein at least a portion of the loop of conductive medium passes out of and back into the sealed enclosure, and wherein, in response to severing of the at least portion of the loop of conductive medium which is outside of the sealed enclosure, the power control circuit is configured to cause activation of the electronic device.

According to a fourth aspect of the present disclosure, there is provided a method of operating the apparatus of the first aspect.

According to a fifth aspect of the present disclosure, there is provided apparatus comprising: a battery; an electronic device in a deactivated state; a power control circuit; and a loop of conductive medium connected to the power control circuit, wherein, in response to severing of the loop of conductive medium, the power control circuit is configured to cause activation of the electronic device.

According to a sixth aspect of the present disclosure, there is provided apparatus substantially in accordance with any of the examples as described herein with reference to and illustrated by the accompanying drawings.

According to a seventh aspect of the present disclosure, there is provided a computer program comprising a set of instructions, which, when executed by a computerized device, cause the computerized device to control an apparatus, the apparatus comprising: a battery encapsulated within a sealed enclosure; an electronic device encapsulated within the sealed enclosure, wherein the electronic device is in a deactivated state; a power control circuit encapsulated within the sealed enclosure; and a loop of conductive medium connected to the power control circuit, wherein at least a portion of the loop of conductive medium passes out of and back into the sealed enclosure, wherein, in response to severing of the at least portion of the loop of conductive medium which is outside of the sealed enclosure, the computer program causes the computerized device to control the power control circuit to cause activation of the electronic device.

Embodiments may be provided in the form of computer programs or non-transitory computer-readable storage mediums comprising computer-executable instructions which, when executed by a processor, cause a computing device to perform various processes.

Further features and advantages of the invention will become apparent from the following description of preferred embodiments of the invention, given by way of example only, which is made with reference to the accompanying drawings.

DETAILED DESCRIPTION

Embodiments of the present disclosure relate to systems (for example apparatus or circuitry) in which a battery is installed and where it is desired that the battery remain as full charged as possible before activation of an associated electronic device. Furthermore, embodiments of the present disclosure relate to systems which are encapsulated within a sealed enclosure and which may be subject to vibration or shock loading during use or before use; such environments can render known methods unsuitable such as those described above.

Some embodiments of the present disclosure solve the problem whereby an electronic device is completely encapsulated or sealed with a pre-installed battery which should remain as fully charged as possible for use as soon as the electronic device is activated and which should remain activated until the battery charge is depleted.

Figure 1:
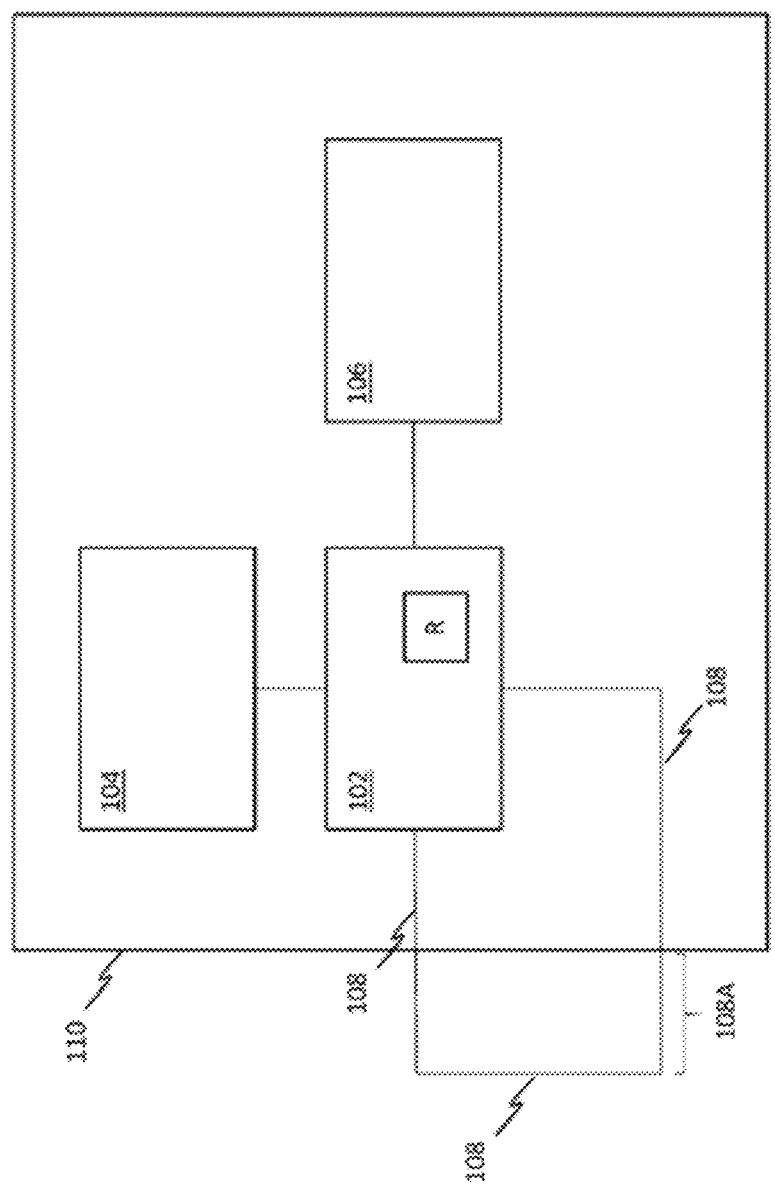
FIG. 1 shows apparatus according to embodiments.

FIG. 1 shows apparatus 100 (or circuitry) according to embodiments. Apparatus 100 comprises a battery 104 (or single cell) encapsulated within a sealed enclosure 110. An electronic device 106 in a deactivated state is also encapsulated within sealed enclosure 110. Further, a power control circuit 102 is encapsulated within sealed enclosure 110. A loop of conductive medium 108 is connected to power control circuit 102. At least a portion 108A of the loop of conductive medium 108 passes out of and back into sealed enclosure 110.

In response to severing of the at least portion 108A of the loop of conductive medium which is outside of the sealed enclosure, power control circuit 102 is configured to cause activation of electronic device 106.

In some embodiments, loop of conductive medium 108 is connected in series with a resistive component R. In the embodiments of FIG. 1, resistive component R is depicted as being comprised within power control circuit 102.

In embodiments, power control circuit 102 is configured to cause activation of electronic device 106 in response to a state change caused by severing of the at least portion 108A of the loop of conductive medium which is outside of the sealed enclosure.

In some embodiments, the state change comprises a change in voltage. In embodiments, power control circuit 102 is configured to cause activation of electronic device 106 in response to a voltage change across resistive component R.

In some embodiments, the state change comprises a change in current. In embodiments, power control circuit 102 is configured to cause activation of electronic device 106 in response to a change in current through resistive component R.

In embodiments, power control circuit 102 is configured to cause activation of electronic device 106 by providing a supply voltage of battery 104 to electronic device 106 in response to severing of the at least portion 108A of the loop of conductive medium.

In some embodiments, loop of conductive medium 108 is connected in series with resistive component R between a supply voltage of battery 104 and ground such that before severing of the at least portion 108A of the loop of conductive medium, approximately the supply voltage appears across resistive component R, and after severing of the at least portion 108A of the loop of conductive medium, approximately a zero voltage appears across resistive component R.

In other embodiments, loop of conductive medium 108 is connected in series with resistive component R between ground and a supply voltage of battery 104 such that before severing of the at least portion 108A of the loop of conductive medium, approximately a zero voltage appears across resistive component R, and after severing of the at least portion 108A of the loop of conductive medium, approximately the supply voltage appears across resistive component R.

Embodiments therefore employ use of a pull-up resistor or a pull-down resistor as resistive component R.

In embodiments, the resistance of resistive component R is much greater than that of conductive medium 108. When the loop of conductive medium is cut, this triggers a state change from low to high or high to low at the intersection between the loop and the resistive component. This state change is used to activate the power control circuit which then powers up the electronic device.

In embodiments, the loop of conductive material runs away from the electronics such that the remainder of the system can be entirely sealed using current sealing technologies such as injection molding or potting the device in a resin. This allows the device to be fully sealed with the battery while retaining the ability to be easily activated. In embodiments, the sealed enclosure comprises a strain rate sensitive material.

In embodiments, power control circuit 102 comprises a latching mechanism such that once activation of electronic device 106 is caused, electronic device 106 remains activated. In some embodiments, power control circuit 102 comprises a latching mechanism such that once activation of electronic device 106 is caused, electronic device 106 remains activated even if the severing of the loop of conductive medium 108 is reversed.

In embodiments, the latching is such that once active, electronic device 106 remains active, even if for example the two loose pieces of cut conductive medium touch each other again (for example reconnected at least momentarily). Embodiments therefore provide a highly reliable way to activate electronic device 106 and overcome problems associated with vibration or shock loading making or breaking contacts which could inadvertently cause resetting.

Embodiments employ a conductive medium (for example a conductive fabric or fine wire) in series with one or more resistive components to produce a state change for triggering a latching circuit to form a solid-state one use switch.

Some embodiments of the present disclosure employ a conductive medium such as a fine wire, conductive thread or conductive textile. In embodiments, a loop or section of the conductive medium is run in a loop out of the enclosure and back into it.

In embodiments, loop of conductive medium 108 comprises a conductive textile. In embodiments, loop of conductive medium 108 comprises a fabric impregnated with carbon black. In embodiments, loop of conductive medium 108 comprises a fabric impregnated with silver conductive ink. In embodiments, loop of conductive medium 108 comprises a conductive thread. In embodiments, loop of conductive medium 108 comprises a wire.

Some embodiments employ a loop of conductive medium 108 in the form of a fabric impregnated with carbon black to make it conductive which is cut to form a 'u-shaped' loop of material. The fabric is then fixed to conductive pads on a printed circuit board (PCB) or suchlike using a conductive adhesive. The fabric then fulfils the role of a cut-able conductive medium element according to embodiments.

In embodiments, loop of conductive medium 108 has a relatively small resistance compared to the resistance of resistive component R. For example, resistive component R may comprise one or more of a 100 k$\Omega$ resistor, a 1 M$\Omega$ resistor, and a 10 M$\Omega$ resistor.

With electronic parameters and ancillary components selected appropriately, the current leakage of the system before activation of the electronic device can be very low, for example in the order of a few micro amps ($O(10^{-6}$ A$)$) or even lower.

In embodiments, sealed enclosure 110 comprises an injection molding. In embodiments, sealed enclosure 110 comprises a potted resin.

In embodiments, loop of conductive medium 108 is integral to the injection molding. In such examples, the injection molding material can provide protection/support to at least portion 108A of the loop of conductive medium which is outside of sealed enclosure 110 until activation to help prevent inadvertent severing. When activation is desired, both at least portion 108A of the loop of conductive medium and also a portion of the injection molding to which at least portion 108A of the loop of conductive medium is integral can be severed together. Embodiments could similarly employ at least portion 108A of the loop of conductive medium being integral to a portion of a potted resin enclosure.

In embodiments, electronic device 106 comprises one or more sensors.

In some embodiments, electronic device 106 comprises one or more of a Global Positioning System (GPS) locator, an accelerometer, a biometric measuring system, a wireless transceiver, and a toy.

In embodiments, battery 104 is not rechargeable. In other embodiments, battery 104 is rechargeable (for example using inductive charging), but there is limited or no access to such battery charging facilities.

In an example military application, a soldier could be equipped with an electronic device in the form of a GPS locator sealed within an enclosure according to embodiments. The GPS locator could for example remain deactivated until such time that the soldier requires assistance and the GPS locator can be activated by severing of the loop of conductive medium. Such embodiments can therefore be useful in environments such as combat environments where charging or recharging of a battery is not possible for extended periods.

Embodiments allow use of fully sealed non-rechargeable electronic devices within products while guaranteeing long shelf life. Embodiments can be used in various products where sealed electronics are present.

Embodiments can for example be applied to wearable technology, military applications, underwater/hazardous environments or service or utilities applications.

The apparatus of embodiments may be incorporated into a wearable item such as a hip protector, a back protector, a limb protector, body armor, a glove, a jacket, a helmet, a sports garment, an activity monitoring garment, a sensor equipped garment, personal protective equipment (for example a "hardhat" or "knee pad") and a medical device.

Figure 2:
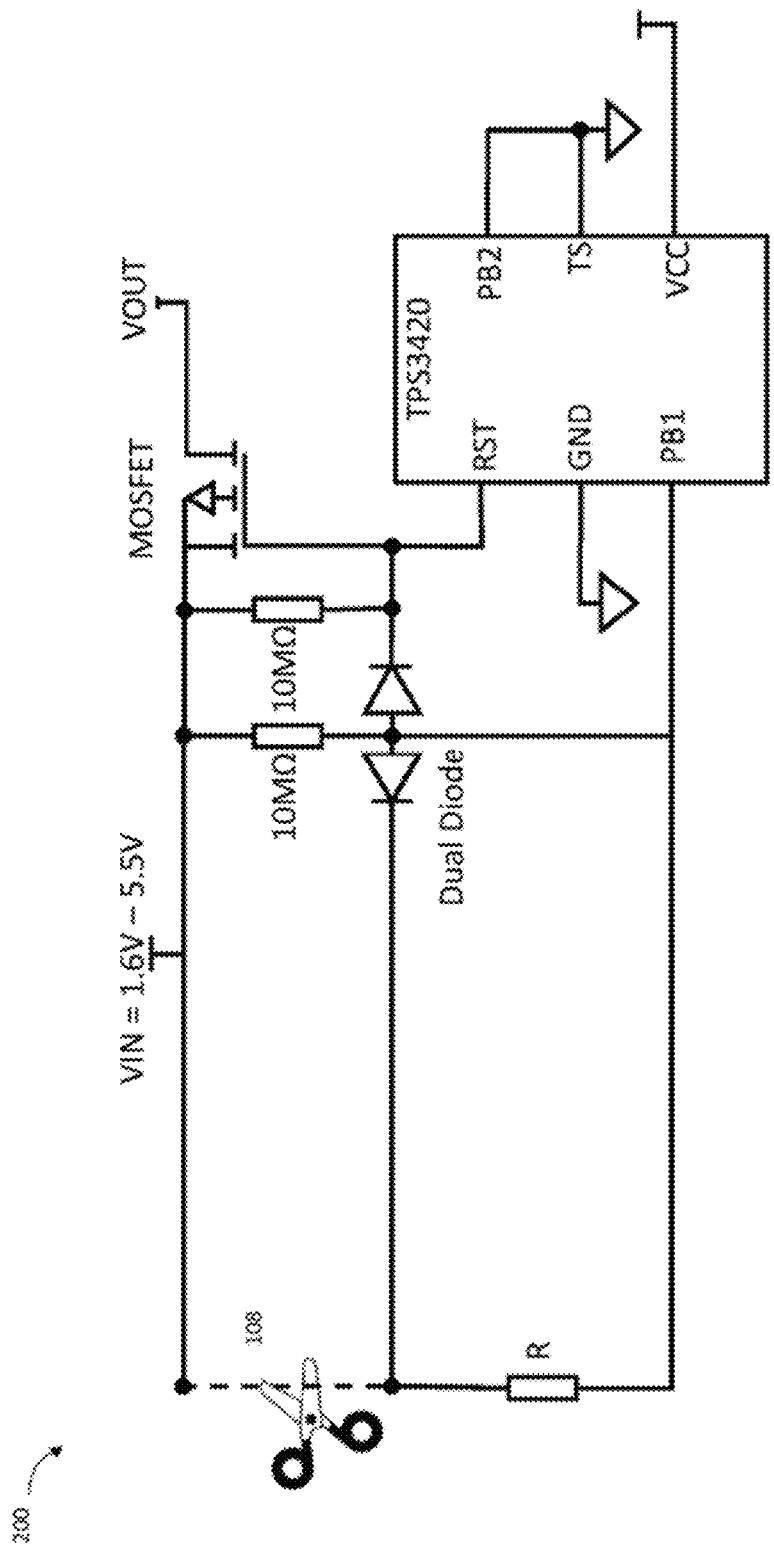
FIG. 2 shows apparatus according to embodiments.

FIG. 2 shows apparatus (or circuitry) according to embodiments. These embodiments a one-time, push-button switch in the form of Texas Instrument's TPS3420 push button controller. In these embodiments, when loop of conductive medium 108 is severed, one half of the dual Shottky diode is connected to ground, which pulls the PB1 input of the TPS3420 low. After the PB1 input goes low, the open-drain output pin RST of the TPS3420 pulls down on the gate of the PMOS MOSFET switch, connecting the electronic device (not shown) at VOUT to the battery. The other half of the dual Shottky diode provides a latching mechanism so that when the RST pin goes low, the PB1 pin also stays low, keeping the RST pin low until the battery is completely discharged or removed. The PMOS MOSFET switch acts as a disconnect switch from the battery to the load.

In embodiments, some or all of the apparatus/circuity depicted in FIG. 2 is comprised within a sealed enclosure apart from at least a portion of conductive medium 108.

In embodiments, the control resistors (depicted as 10 MΩ resistors in FIG. 2) are modified to produce different standby leakage currents.

Alternative embodiments employ a different power control circuit to that depicted in FIG. 2. Such alternative embodiments could involve the use of one or more power transistors or MOSFETs which keep the electronic device off until activation following a state change from the cutting or breaking of the loop of conductive medium. Further, a latching circuit comprising one or more transistors, MOSFETs or integrated circuits could be employed.

The above embodiments are to be understood as illustrative examples of the invention. Further embodiments of the invention are envisaged.

For example, alternative embodiments do not comprise encapsulating one or more of the battery, the electronic device, and the power control circuit within a sealed enclosure.

Embodiments comprise apparatus comprising a battery, an electronic device in a deactivated state, a power control circuit, and a loop of conductive medium connected to the power control circuit. In response to severing of the loop of conductive medium, the power control circuit is configured to cause activation of the electronic device.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A wearable item comprising:
   an apparatus, the apparatus comprising:
   a battery encapsulated within a sealed enclosure;
   an electronic device encapsulated within the sealed enclosure, wherein the electronic device is initially in a deactivated state;
   a power control circuit encapsulated within the sealed enclosure and electrically connected to the electronic device; and
   a loop of conductive medium connected to the power control circuit,
   wherein at least a portion of the loop of conductive medium passes out of and back into the sealed enclosure,
   wherein, the power control circuit is configured to cause activation of the electronic device in response to severing of the at least portion of the loop of conductive medium that is outside of the sealed enclosure, and
   wherein the wearable item comprises one or more of:
   a hip protector,
   body armor,
   back protector,
   limb protector,
   a glove,
   a helmet,
   a jacket,
   a sports garment,
   an activity monitoring garment,
   a sensor equipped garment,
   personal protective equipment, or
   a medical device.

2. The wearable item according to claim 1, wherein the loop of conductive medium is connected in series with a resistive component of the power control circuit.

3. The wearable item according to claim 1, wherein the power control circuit is configured to cause activation of the electronic device in response to a state change caused by severing of the at least portion of the loop of conductive medium.

4. The wearable item according to claim 3, wherein state change comprises a change in voltage.

5. The wearable item according to claim 3, wherein the state change comprises a change in current.

6. The wearable item according to claim 1, wherein the power control circuit is configured to cause activation of the electronic device by providing a supply voltage of the battery to the electronic device in response to severing of the at least portion of the loop of conductive medium.

7. The wearable item according to claim 2, wherein the power control circuit is configured to cause activation of the electronic device in response to a voltage change across the resistive component.

8. The wearable item according to claim 2, wherein the power control circuit is configured to cause activation of the electronic device in response to a change in current through the resistive component.

9. The wearable item according to claim 2, wherein the loop of conductive medium is connected in series with the resistive component between a supply voltage of the battery and a ground such that before severing of the at least portion of the loop of conductive medium approximately the supply voltage appears across the resistive component and after severing of the at least portion of the loop of conductive medium approximately a zero voltage appears across the resistive component.

10. The wearable item according to claim 2, wherein the loop of conductive medium is connected in series with the resistive component between a ground and a supply voltage of the battery such that before severing of the at least portion of the loop of conductive medium approximately a zero voltage appears across the resistive component and after severing of the at least portion of the loop of conductive medium approximately the supply voltage appears across the resistive component.

11. The wearable item according to claim 1, wherein the power control circuit comprises a latching mechanism such that once activation of the electronic device is caused, the electronic device remains activated.

12. The wearable item according to claim 1, wherein the power control circuit comprises a latching mechanism such that once activation of the electronic device is caused, the electronic device remains activated even if the severing of the loop of conductive medium is reversed.

13. The wearable item according to claim 2, wherein the loop of conductive medium has a first resistance, the resistive component has as second resistance, and the first resistance is smaller than the second resistance.

14. The wearable item according to claim 1, wherein the loop of conductive medium comprises one or more of:
   a conductive textile,
   a fabric impregnated with carbon black,
   a conductive thread, or
   a wire.

15. The wearable item according to claim 2, wherein the resistive component comprises one or more of:
   a 100 kΩ resistor,
   a 1 MΩ resistor, or
   a 10 MΩ resistor.

16. The wearable item according to claim 1, wherein the sealed enclosure comprises an injection molding.

17. The wearable item according to claim 16, wherein the loop of conductive medium is integral to the injection molding.

18. The wearable item according to claim 1, wherein the sealed enclosure comprises a strain rate sensitive material.

19. The wearable item according to claim 1, wherein the sealed enclosure comprises a potted resin.

20. The wearable item according to claim 1, wherein the electronic device comprises one or more sensors.

21. The wearable item according to claim 1, wherein the electronic device comprises one or more of:
   a Global Positioning System (GPS) locator,
   an accelerometer,
   a wireless transceiver, or
   a toy.

22. The wearable item according to claim 1, wherein the battery is not rechargeable.

* * * * *